April 7, 1925.  1,532,541
A. F. MASURY
CUSHION CONNECTION FOR VEHICLE CONSTRUCTION
Filed April 23, 1923   2 Sheets-Sheet 1
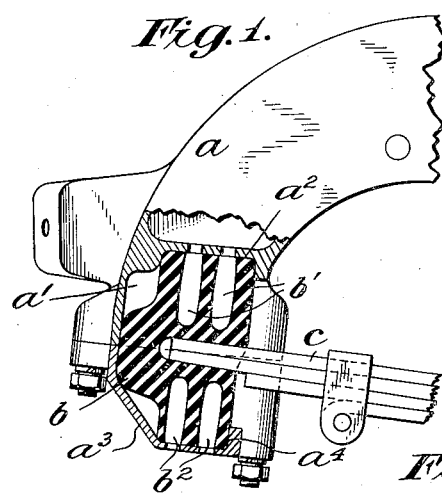
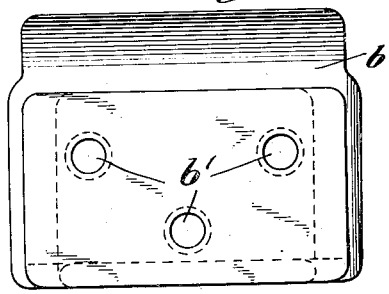
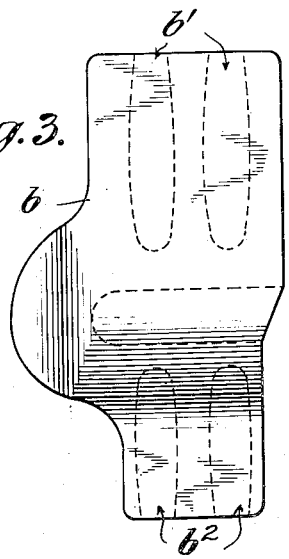
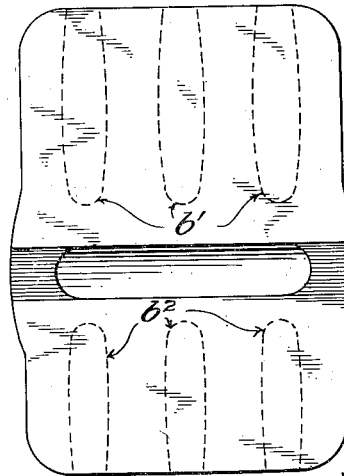
INVENTOR
Alfred F. Masury
BY
Redding, Greeley, O'Shea & Campbell
ATTORNEYS April 7, 1925.                                                1,532,541
A. F. MASURY
CUSHION CONNECTION FOR VEHICLE CONSTRUCTION
Filed April 23, 1923        2 Sheets-Sheet 2

INVENTOR
Alfred F. Masury
BY
Redding, Greeley, O'Shea & Campbell
ATTORNEYS.

Patented Apr. 7, 1925.

1,532,541

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

CUSHION CONNECTION FOR VEHICLE CONSTRUCTION.

Application filed April 23, 1923. Serial No. 633,823.

*To all whom it may concern:*

Be it known that I, ALFRED F. MASURY, a citizen of the United States, residing in the borough of Manhattan of the city of New York, in the State of New York, have invented certain new and useful Improvements in Cushion Connections for Vehicle Construction, of which the following is a specification, reference being had to the accompanying drawings, forming a part hereof.

This invention relates to the type of cushion connection shown, described and claimed broadly in Letters Patent of the United States No, 1,404,876 dated January 31, 1922. The underlying practice disclosed by the device illustrated in that patent is the confining of a non-metallic yielding material under compression to constitute a mechanical connection between two metallic parts. When the material is confined under compression it tends to "flow" so that it not only adapts itself intimately to the connected parts but affords in use the greatest possible degree of resiliency combined with effective transmission of mechanical stresses. The object of the present invention is to incorporate in a connection of the character thus described recesses or interstices which may be desirable under some conditions of use and have the effect of increasing the "fluidity" of the material and, perhaps, its resilient properties. In one embodiment of the improvements it is proposed to expose such interstices freely to the atmosphere while in the other form some restriction will be applied at their ends to shut off the atmosphere to a greater or less degree thereby entrapping air in one or more pockets. This effect will obviously be conducive to a high degree of resiliency.

While the invention is not to be limited to the precise form or use of the cushion connection in which the improvements are incorporated nor to the form or arrangement or number of interstices, the embodiments shown in the accompanying drawings will serve to illustrate fully the principle involved. In the drawings:

Figure 1 is a view in vertical section of an improved cushion connection indicating conventionally its application to the end of a vehicle spring and its confinement in a housing carried by the frame.

Figure 2 is a view in plan of the block shown in Figure 1.

Figures 3 and 4 are views in side elevation and end elevation, respectively, of the same block, the interstices extending inwardly from the upper and lower faces thereof.

Figure 5:
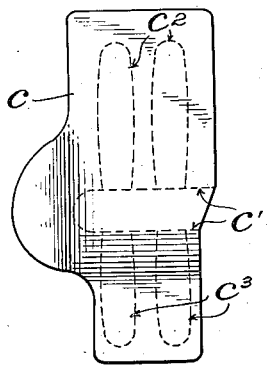
Figures 5, 6 and 7 are views in side elevation, end elevation and plan, respectively, showing a similar block in which the interstices extend outwardly from the opening in the block which receives the spring or other metallic part engaged with the block.

As indicated hereinbefore, the invention is not to be limited in the material, form or use of the cushion connection but for the purposes of this application it has been elected to show and describe a cushion connection comprising a rubber block interposed between the end of a motor vehicle spring and its frame in the manner and for the reasons brought out more fully in said Letters Patent of the United States No. 1,404,876. Referring to Figure 1, for instance, one end of the frame of the vehicle is illustrated in part at $a$ and is formed with a housing $a'$ which has a seat $a^2$ to receive a block $b$ of non-metallic yielding material such as rubber and a cap $a^3$ which is bolted onto the end of the frame in complementary relation to the housing $a'$ and also affords a seat indicated at $a^4$ for the block or a separate block disposed in corresponding relation to the spring $c$ the end of which extends into the open side of the housing. It will be understood that the block $b$ may or may not be of a unitary character since two or more separate units of material may be so mounted with respect to the spring $c$ as to serve, under some conditions, the same mechanical uses and purposes. The block $b$ may, for instance, be made of rubber and is confined under compression. The effect of this is to cause it to "flow" in such a way as to best adapt it to its purposes as a yielding but substantial mechanical connection between the two metallic parts $a$ and $c$. Thus far, the conditions described are those brought out in said Letters Patent of the United States No. 1,404,876. The present improvements consist in incorporating interstices in such a non-metallic yielding connection which interstices may be open-ended so as to expose the air therein to the atmosphere, or nominally closed so as to confine the air more or less therein. This construction may be advantageous under some conditions and may serve particularly to increase the "fluidity" of the material and perhaps the resiliency of the connection. The invention is not to be limited to the number, form or arrangement of these interstices with respect to any particular surfaces of the block or of the metal parts but the arrangements illustrated in the drawings serve to bring out the principle and the permissible variations. As shown in Figures 1–4 the block $b$ has a plurality of open-ended interstices $b'$, $b^2$ extending into its body from the upper and lower faces, respectively. These interstices may be swelled so as to leave a somewhat restricted opening so that the air therein will be of relatively greater volume and its escape somewhat restricted. However, in the form of mounting shown in Figure 1 it is not proposed to confine the air to any great degree within these interstices.

Figure 6:
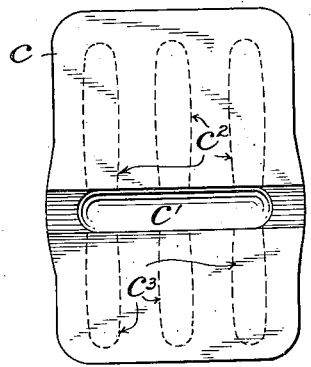
Figure 7:
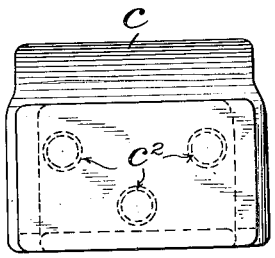

In the construction shown in Figures 5–7 the block $c$, which has an open side at $c'$ to receive the spring or other metal part, is provided with interstices $c^2$, $c^3$, which extend into the body of the block from the upper and lower sides, respectively, of the opening $c'$.

Figure 8:
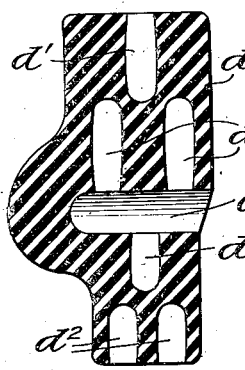
Figure 8 is a view in vertical section taken on the planes indicated by the broken lines 8—8 of Figure 9 and looking in the direction of the arrows, showing a block in which interstices are provided both on the outer faces and the faces which engage the spring.
Figure 9:
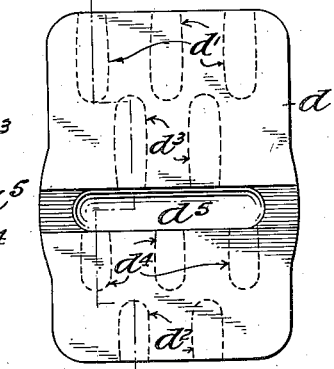
Figures 9 and 10 are views in end elevation and plan of the block shown in Figure 8.
Figure 10:
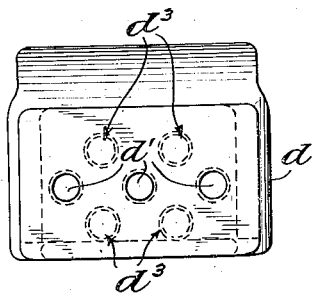

In the block $d$ illustrated in Figures 8–10 such interstices $d'$, $d^2$, as were described with reference to the embodiment of Figures 1–4 extend inwardly from the upper and lower faces, respectively, while other interstices $d^3$, $d^4$, extend from the upper and lower faces, respectively, of the opening $d^5$ where the spring or other part rests.

Figure 11:
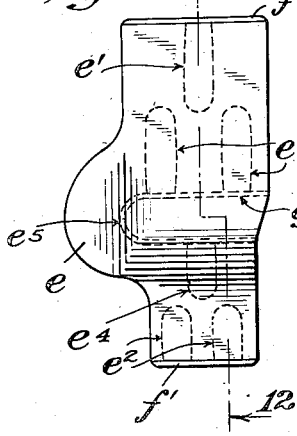
Figure 11 is a view in side elevation of a block provided with interstices the ends of which are adapted to be closed more or less.
Figure 12:
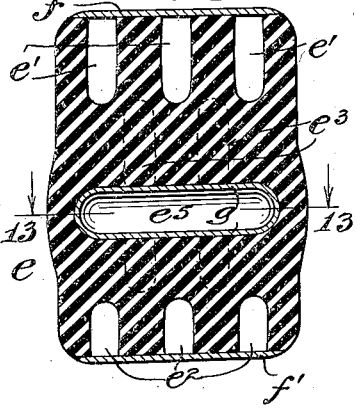
Figure 12 is a sectional view taken on the planes indicated by the lines 12—12 of Figure 11 and looking in the direction of the arrows.
Figure 13:
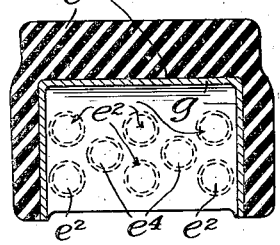
Figure 13 is a view in horizontal section taken on the plane indicated by the line 13—13 of Figure 12 and looking in the direction of the arrows.

In Figures 11–13 is illustrated a condition wherein it is proposed to confine the air more or less within the interstices provided in the block $e$. For instance, where the interstices $e'$, $e^2$, are formed at the upper and lower faces, respectively, of the block, their outer ends may be covered by a sheet of rubber $f$, $f'$, respectively, or a sheet of other suitable material either metallic or non-metallic, such as sheet metal or rawhide, etc. The effect of the coverings $f$, $f'$, is to confine the air more or less within the interstices $e'$, $e^2$, so that possibly even greater resiliency is secured without permitting the material to become too "fluid." Where other interstices such as $e^3$, $e^4$ extend into the body of the block from the opening $e^5$ which may receive the spring or other metal part the ends of such openings may be covered by a sheet of suitable material, such as rubber, indicated at $g$, and a similar action thereby obtained.

Variations in form and arrangement may be made without departing from the spirit of the invention.

What I claim is:

1. A block of non-metallic yielding material for the purpose described adapted to be interposed operatively between two metallic parts which are to be connected thereby and having interstices formed on the faces with which the metallic parts engage.

2. A block of non-metallic yielding material for the purpose described adapted to be interposed under compression between two metallic parts to be engaged thereby and having a plurality of interstices formed therein.

3. A block of non-metallic yielding material of the character described adapted to be interposed under compression between two metallic parts to be connected thereby and having formed therein elongated interstices in which air is confined more or less.

4. In combination with the frame and spring of a vehicle, a non-metallic yielding connection interposed operatively therebetween, means to confine the block under compression and maintain it against displacement with respect to the frame and spring, said block having a plurality of elongated interstices therein to receive air and means to confine the air more or less within said interstices.

5. In combination with the frame and spring of a vehicle, a rubber connection interposed operatively therebetween, means to confine the block under compression and maintain it against displacement with respect to the frame and the spring, said block having a plurality of elongated interstices therein to receive air, and a sheet of rubber to confine the air more or less within said interstices.

This specification signed this 19th day of April, A. D. 1923.

ALFRED F. MASURY.